May 6, 1952 — C. L. CALDWELL — 2,595,224
METHOD AND APPARATUS FOR PROCESSES EMPLOYING FLUENT SOLIDS
Filed Oct. 29, 1947 — 3 Sheets-Sheet 2
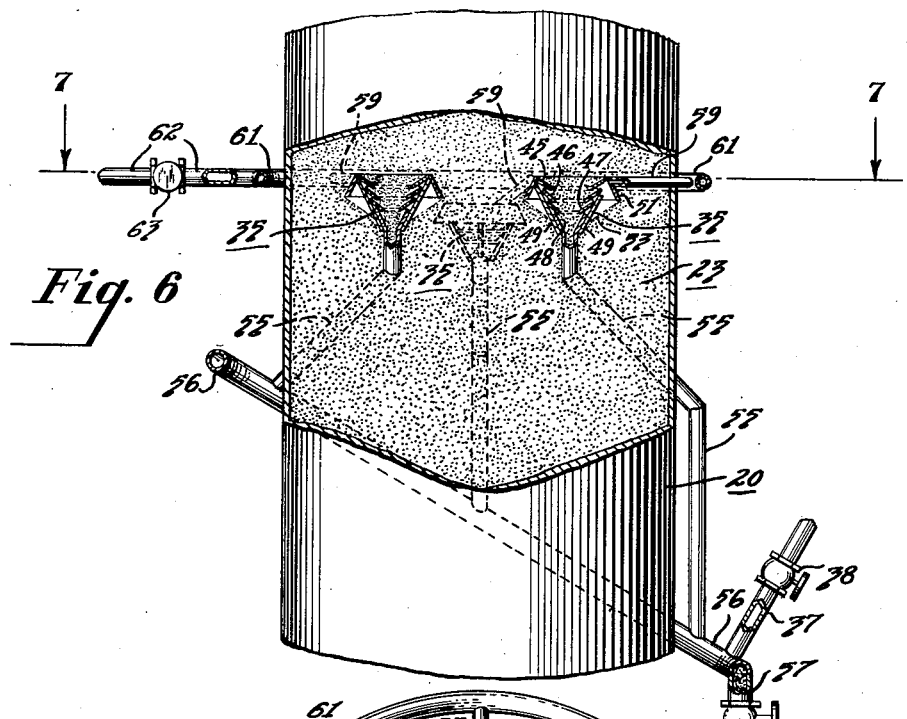
Inventor
Clyde L. Caldwell
By Gordon A. Kessler
Attorney May 6, 1952

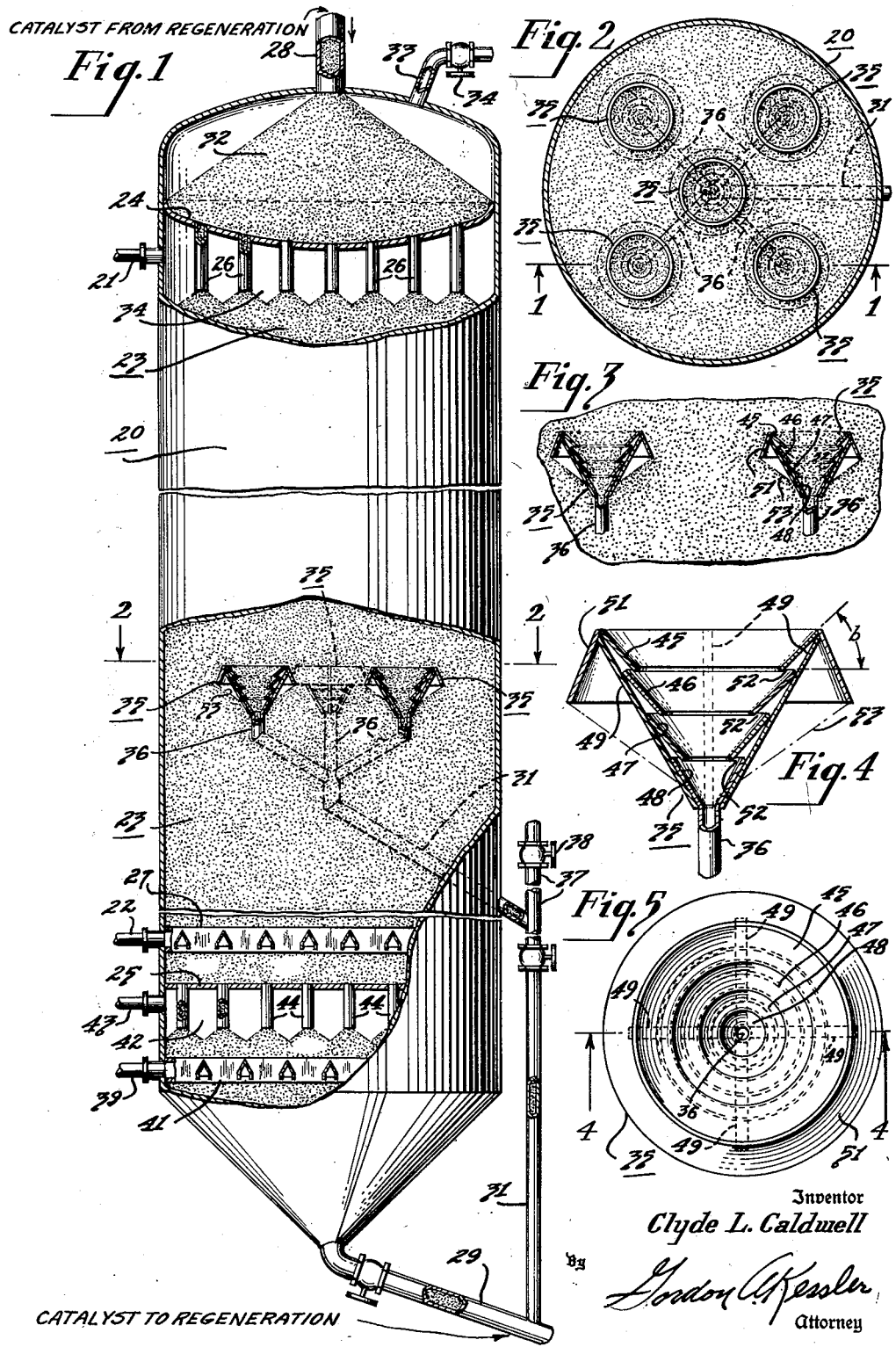

C. L. CALDWELL 2,595,224

METHOD AND APPARATUS FOR PROCESSES EMPLOYING FLUENT SOLIDS

Filed Oct. 29, 1947

Inventor
Clyde L. Caldwell
By Gordon A. Kessler
Attorney

Patented May 6, 1952

2,595,224

UNITED STATES PATENT OFFICE 2,595,224

METHOD AND APPARATUS FOR PROCESSES EMPLOYING FLUENT SOLIDS

Clyde L. Caldwell, Long Beach, Calif., assignor to Houdry Process Corporation, Wilmington, Del., a corporation of Delaware Application October 29, 1947, Serial No. 782,887

10 Claims. (Cl. 196—52)

This invention relates to an improved method and apparatus for carrying out processes wherein fluid organic compounds to be converted are contacted with moving solid contact materials, and particularly relates to improvements in methods and apparatus employed in the continuous conversion of hydrocarbons wherein hydrocarbons contact fluent solid hydrocarbon conversion catalysts.

When hydrocarbons contact a catalyst under conversion conditions including elevated temperatures, such as above 600° F., so as to form conversion products containing hydrocarbons different in molecular weight or structure or both, hydrocarbonaceous material, commonly referred to as coke, is concomitantly deposited on the catalyst and causes a reduction in catalytic activity. The catalyst is therefore periodically regenerated, as by contact with a free oxygen containing gas under combustion conditions, to effect removal of the deposit of coke and thus maintain catalytic activity. Accordingly, the hydrocarbon process may be performed as a continuous operation by the use of a technique in which fluent solid hydrocarbon conversion catalyst is circulated in a system comprising a conversion zone and a regeneration zone.

In one method of moving the catalyst through such a system, the solid catalyst is in particulate or granular form, such as spheres or beads, sized particles, cast or extruded pellets or the like, and is sized so that the pressure drop of vapors passed through a bed of such particles is not excessive, a convenient size being such that the bulk of the catalyst will pass a three mesh screen and be retained by an eight mesh screen. Catalyst of such a size is fluent or capable of flowing and may conveniently be passed through a process zone for contact with process fluids as a downwardly moving non-turbulent bed (i. e., the process fluids, even when in countercurrent flow relationship, do not cause turbulence or ebullience of the solid and hence the bed is in compact, unmixed form). It has been the common practice to pass the hydrocarbons through a bed of catalyst which has a constant horizontal cross sectional area and to vary conversion conditions, such as temperature, pressure, space velocity (the volume of hydrocarbon material charged to a conversion zone per hour, divided by the volume of catalyst present in the reactor), catalyst to oil ratio (the ratio of the rates of introduction of catalyst and oil to the conversion zone, expressed in terms of weight), and rate of catalyst circulation (weight of catalyst passed through the conversion zone per hour) for the entire body of catalyst.

In accordance with the present invention, I provide additional flexibility in processes for contacting fluid or vaporous organic compounds with moving solid contact materials such as fluent solid catalyst, especially in catalytic hydrocarbon conversion processes of the type described above, by varying the rate of contact material circulation in the various portions of the reaction zone. To this end, I prefer to employ a reactor equipped with devices described more fully below by which I pass fluent catalyst through the reactor as a continuous downwardly moving non-turbulent bed and withdraw from the conversion zone in said reactor as at least one compact column a substantial portion, such as from 10 to 90 and preferably from 20 to 70 percent, of said catalyst from a point intermediate of the vertical extent of said bed so that the rate of catalyst circulation through the part of the conversion zone above the point of withdrawal is greater than the rate of catalyst circulation in the part of the conversion zone below said point and disengage hydrocarbon vapors in contact with the catalyst in the conversion zone from the portion of the catalyst so withdrawn substantially at the point of withdrawal. Additionally, I may confine hydrocarbon vapors present in the conversion zone, aid in the disengagement of hydrocarbon vapors from the catalyst so withdrawn and prevent escape of such vapors from the conversion zone by introducing to the compact column of withdrawn catalyst at a point beyond the conversion zone an unreactive gas, such as spent flue gas, steam, nitrogen, methane or other light hydrocarbon gases, at a pressure above the pressure in the conversion zone.

By varying the rate of catalyst circulation in the various portions of the conversion zone, I may maintain different catalyst to oil ratios in these portions and thus adjust the severity of the catalytic action to that best suited to the hydrocarbon vapors present in any portion of the conversion zone without the use of additional reactors. In one embodiment of the invention, I introduce hydrocarbons, such as a mixture of more and less refractory hydrocarbons, to be converted, as by cracking, to the bottom of a reactor as herein described and contact these hydrocarbons in a lower portion of the conversion zone with hydrocarbon conversion catalyst, such as a cracking catalyst, at a low catalyst to oil ratio and thereby convert the less refractory hydrocarbons and then contact in an upper portion of the conversion zone the resultant mixture of converted and unconverted hydrocarbons with the catalyst at a high catalyst to oil ratio and thereby convert the more refractory hydrocarbons.

In another embodiment of the invention, I contact the catalyst in the upper and lower portions of the conversion zone previously described with hydrocarbons of different composition. Under such conditions, although the amount of catalyst passing through the upper and lower portions is different, the hydrocarbon charge stocks may be charged at different ratios so as to maintain, if desired, the same catalyst to oil ratio in both upper and lower portions and thereby process different amounts of two different hydrocarbon charge stocks at the same catalyst to oil ratio in a single reactor. Because of the flexibility inherent in the present invention, two different hydrocarbon charge stocks may be processed under a wide variety of conditions, including different catalyst to oil ratios, in the various portions of the conversion zone.

As may be understood from the description above, I effect the conversion of one of more hydrocarbon charge stocks under a plurality of operating conditions in a single reactor vessel. I may combine catalyst withdrawn from an intermediate point in the conversion zone and catalyst discharged from the bottom of the reactor vessel and regenerate the resultant mixture in a single regeneration vessel and thus provide an overall hydrocarbon conversion system of considerable flexibility combined with the economic advantages of low equipment costs.

The present invention and various embodiments thereof, together with their application and advantages, are described below in connection with the drawings in which, presented in a schematic manner:

Fig. 1 is an elevation with parts broken away and in section of a vessel containing a catalytic conversion chamber provided with elements for the introduction and withdrawal of catalyst and hydrocarbon charge stock;

Fig. 2 is a horizontal section of the vessel of Fig. 1 taken along the line 2—2;

Fig. 3 illustrates the operation of a catalyst withdrawal device;

Figs. 4 and 5 are enlarged detailed views of the same catalyst withdrawal device;

Fig. 6 is an elevation of a portion of a vessel, similar to Fig. 1, showing a modified catalyst withdrawal device comprising elements for the disengagement of hydrocarbon vapors from the catalyst withdrawn.

Fig. 7 is a horizontal section of the vessel in Fig. 6 taken along the line 7—7.

Figure 8:
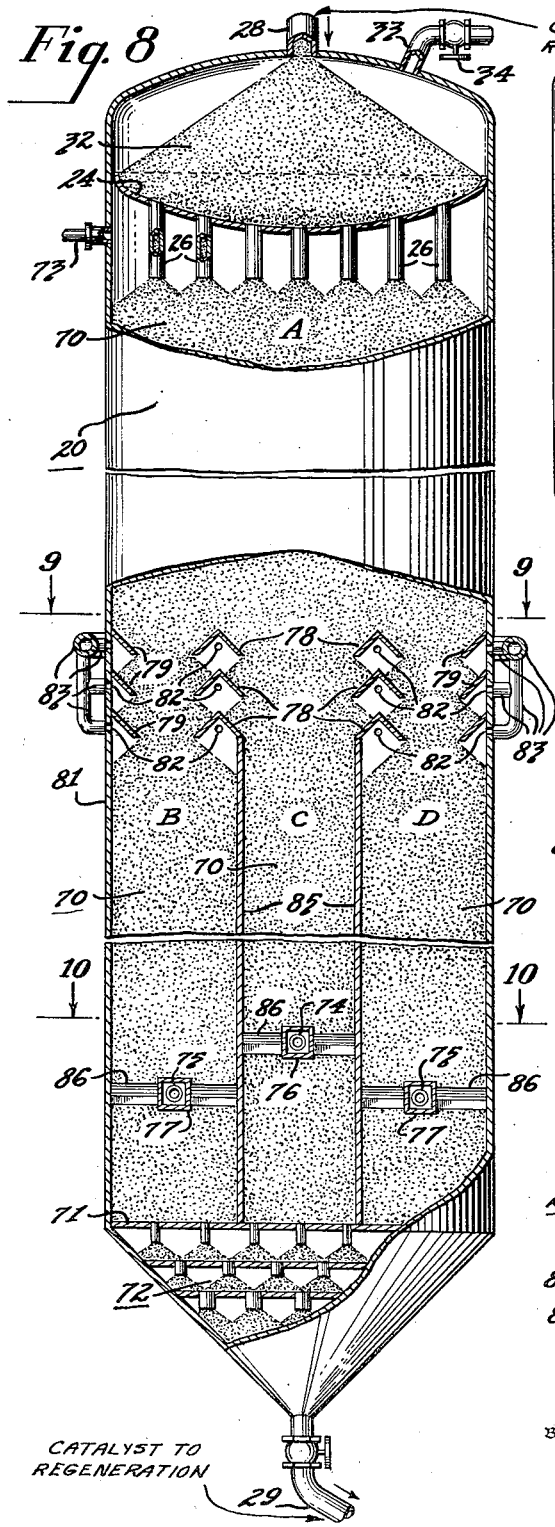
Fig. 8 is an elevation with parts broken away and in section of a vessel in which the lower part thereof is divided into a plurality of vertical non-communicating sections.
Figure 9:
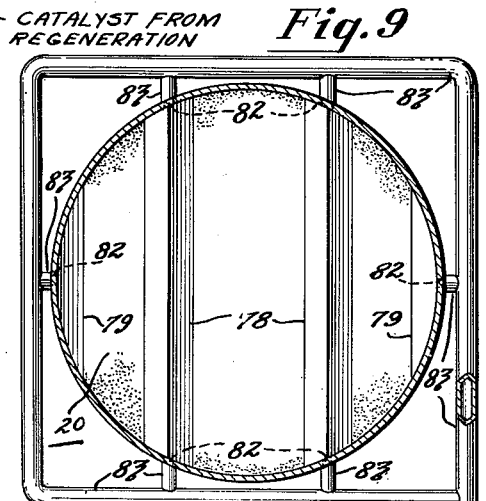
Fig. 9 is a horizontal section of the vessel in Fig. 8 taken along the line 9—9.
Figure 10:
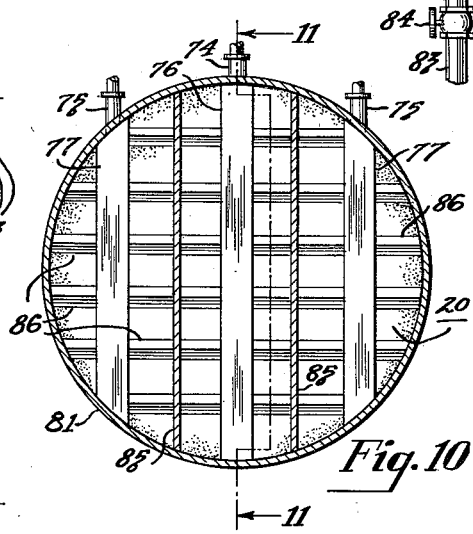
Fig. 10 is a horizontal section of the vessel in Fig. 8 taken along the line 10—10.
Figure 11:
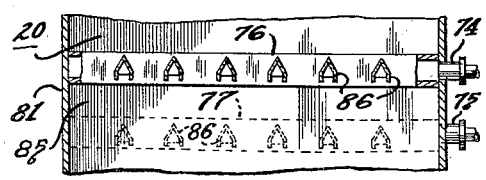
Fig. 11 is a side view of fluid introduction elements in the vessel in Fig. 8.

In accordance with a preferred embodiment of my invention exemplified in Fig. 1, I provide a vessel or housing indicated generally at 20 which vessel contains a conversion zone of substantially equal horizontal cross sectional area throughout its vertical extent. The vessel is provided with conduits 21 and 22 for the introduction and removal of hydrocarbon vapors from the conversion zone, which is contained in a vertically elongated chamber indicated generally at 23 which extends from plate 24 to plate 25. The conversion zone occupies substantially all of chamber 23 and extends from the bottom of pipes 26 to the vapor collecting or distributing device 27. Vessel 20 is also provided with a conduit 28 for the introduction of a fluent solid hydrocarbon conversion catalyst, conduit 29 for the withdrawal of catalyst from the bottom of the vessel and conduit 31 for the reception of catalyst withdrawn from an intermediate point in the vertical extent of the conversion zone.

In operation, catalyst, preferably from a regenerator or kiln (not shown), is introduced to vessel 20 by means of a conduit 28 and flows into a storage chamber 32, where it rests on plate 24. The catalyst flows out of storage chamber 32 into chamber 23 by means of a plurality of pipes 26 which insure even distribution of the catalyst over the horizontal cross sectional area of chamber 23 and also provide resistance to flow of vapors from chamber 23 into the storage chamber 32. The flow of vapors from chamber 23 into the chamber 32 is also prevented by introducing a sealing gas, such as steam, spent flue gas, nitrogen and similar unreactive or inert gases, through conduit 33 at a pressure at least sufficient to balance the pressure exerted by the vapors in chamber 23, the pressure being controlled by valve 34.

The catalyst introduced by pipes 26 flows downwardly through chamber 23 by gravity as a continuous downwardly moving bed. Hydrocarbon vapors heated to a suitable temperature may be introduced through the conduit 22 and a vapor distributing device 27, described more fully below, at a velocity such that the downwardly moving bed is in a non-turbulent state as described above. The hydrocarbons so introduced are disengaged from the surface of the catalyst in a disengaging chamber 34 and are removed by conduit 21. Alternatively, hydrocarbon vapors may be introduced by conduit 21 and removed by device 27 and conduit 22.

At a point intermediate in the vertical extent of the downwardly moving non-turbulent bed of catalyst in the conversion zone, a portion of the catalyst is withdrawn through a plurality of catalyst withdrawal devices indicated generally at 35. This device (described more fully in connection with Figs. 2, 3, 4 and 5) provides withdrawal of the catalyst without considerably restricting the horizontal cross sectional area available for the flow of hydrocarbon vapors so that these vapors are easily disengaged from the catalyst withdrawn. The catalyst so withdrawn moves downwardly through conduits 36 to and through a manifold conduit 31 as a compact column. In order to prevent the hydrocarbon vapors in chamber 23 from escaping through conduit 31, I provide means for introducing a sealing gas, which may be a gas such as that introduced by conduit 33, to the compact column of withdrawn catalyst at a point beyond the conversion zone such as by conduit 37. The sealing gas is introduced at a pressure above the pressure in the conversion zone at the point of withdrawal of the catalyst (i. e., where the catalyst enters conduit 36), this pressure being controlled by valve 38. The pressure of the sealing gas may be just sufficient to balance the pressure in the conversion zone or it may be slightly greater so that a relatively small amount of sealing gas flows into the conversion zone, thus aiding in the disengagement of hydrocarbon vapors from the catalyst withdrawn through conduit 36.

Catalyst which has passed through the conversion zone is withdrawn through a catalyst withdrawal device (not shown) and is conveyed by conduit 29 together with catalyst withdrawn by conduit 28 to a regenerator (not shown) which may be of any conventional type, in which the coked catalyst is contacted with oxygen or an oxygen containing gas for the removal of coke, after which it may be returned to the reactor by means of conduit 28.

If desired, vessel 20 may include means for purging the catalyst of volatile hydrocarbons. Thus steam may be introduced by conduit 39 and a vapor distributing device 41 similar to device 27, pass upwardly through a shallow bed of catalyst, be disengaged in vapor disengaging chamber 42 from the surface of the catalyst and be removed by conduit 43. Pipes 44 serve a similar purpose to pipes 26.

In order to withdraw the catalyst from an intermediate point of the vertical extent of conversion zone 23 in accordance with the present invention, I provide a catalyst withdrawal device previously indicated generally at 35 and shown in more detail in Figs. 2, 3, 4 and 5. A plurality of these devices is placed at an appropriate level or levels in chamber 23 and preferably, as shown in Fig. 2, distributed over the horizontal cross sectional area of the chamber so as to withdraw the catalyst evenly from the various sectors of the bed. The catalyst withdrawal device comprises a vertically extending series of inverted frusto-conical baffles 45, 46, 47 and 48 positioned above conduit 36, the series of baffles being of decreasing diameter in a downward direction, and the lowermost baffle 48 communicating with conduit 36. The various baffles may be inclined at different angles to the horizontal as shown in Fig. 4 or the various angles may be the same; but in any event the angle is preferably greater than the angle of repose of the fluent solid catalyst passing therethrough. The baffles are spaced apart by and maintained in a permanent relationship by straps 49 to which the baffles are affixed, as by welding. The uppermost baffle 45 is preferably provided with an element or member 51 which, as shown in Fig. 3, extends horizontally in a centrifugal direction to a sufficient extent that catalyst flowing outside the series of baffles is spaced away from the baffles.

In operation the catalyst flows downwardly through the series of baffles which are spaced apart so as to provide spaces 52 for vapor communication between the catalyst in the withdrawal device and the catalyst in the remainder of the bed. In the event that the sealing gas introduced by conduit 37 just balances the pressure of the vapors in chamber 23 at the top of conduit 36, hydrocarbon vapors may pass between the catalyst in the withdrawal device and the catalyst in the remainder of the bed through the surface of the catalyst 53 formed by the action of element 51, the direction of travel of such vapors depending upon the direction of flow of hydrocarbon vapors through the bed. In the event that a somewhat higher pressure of sealing gas is employed, the sealing gas itself may pass through spaces 52 and the surface 53 formed by the flowing catalyst as well as upwardly through the catalyst in the withdrawal device.

As shown in Fig. 6, a plurality of modified forms of catalyst withdrawal devices 35, may be placed at two levels in chamber 20 in staggered relation to each other, thus minimizing any interference with the flow of the catalyst. Devices 35 communicate with conduits 55 for the withdrawal of catalyst; conduits 55 feeding into a manifold 56 slanted downward and adapted to direct all of the withdrawn catalyst to a conduit 57 which may join the conduit by which catalyst is removed from the bottom of the reactor, valve 58 controlling the amount of catalyst so withdrawn. Conduit 37 for the introduction of a sealing gas as described above is attached to and communicates with manifold 56.

In view of the foregoing description, it is apparent that devices 35 define or constitute the boundaries of downwardly converging paths for the flow of portions of the catalyst, which paths are within the conversion zone and which are laterally pervious to flow of gases and impervious to flow of solids. Conduits 36 and 57 communicate with the bottoms of these paths and define or constitute paths for the flow of catalyst to locations outside the conversion zone and bed, which latter paths are impervious to lateral flow of gases.

The uppermost baffle 45 of the withdrawal device forms with element 51 an inverted channel. Such an inverted channel is adapted to split the downwardly moving fluent solid catalyst into two streams of catalyst because it is, in cross section, an angle with the apex upward. It will be noted that the inverted channel bounds, together with catalyst surface 53, a vapor space or zone containing only vapors and substantially devoid of catalyst. Conduits 59, passing through elements 51, communicate with the vapor spaces above catalyst surfaces 53 and are employed to remove hydrocarbon vapors therefrom. These vapors pass to manifold 61 and may be forwarded by conduit 62 to a conventional fractionating system, together with vapors from conduits 21 or 22 if desired, such as for the preparation of gasoline and/or other products of cracking or treating such as naphthas, diesel fuels and fuel oils.

The vessel shown in Fig. 6 permits considerable flexibility of operation. Two different hydrocarbon charge stocks may be introduced at opposite ends of the bed of catalyst as by conduits 21 and 22, pass downwardly and upwardly, respectively, through the bed and commingled unconverted portions and conversion products be removed in the zone defined by the inverted channels of the catalyst withdrawal devices. Alternatively valve 63 in conduit 62 may be closed and hydrocarbons introduced at either end of the conversion zone may be passed through substantially the complete vertical extent of the bed without removal of any vapors or valve 63 may be adjusted to remove only a part of the vapors. In all of these operations, the rate of catalyst circulation and, since the conversion zone is of substantially equal horizontal cross sectional area through its vertical extent, the mass velocity of the catalyt are greater in the upper part of the conversion zone above the point of catalyst withdrawal than in the lower part of the conversion zone below the point of withdrawal of catalyst. (The mass velocity of the catalyst may be defined as the weight of catalyst passing through a horizontal cross sectional area of one square foot in one hour.)

In another embodiment of the invention shown in Fig. 8, an elongated vertical housing 20 contains various zones indicated as A, B, C, and D. These zones are within a chamber which is of substantially equal horizontal cross sectional area throughout its vertical extent (from plate 24 to plate 71) and which is indicated generally at 70. Catalyst is fed to the uppermost zone A through conduits or pipes 26, which operate in a manner described in connection with Fig. 1. The catalyst so introduced passes downwardly through chamber 70 as a continuous non-turbulent bed and is removed by a catalyst withdrawal device well known to the art and indicated generally at 72, plate 71 being the uppermost element of device 72. The catalyst may then be conveyed by conduit 29 to a regenerator. Fluid inlet or outlet means at substantially the extremities of the bed are provided by conduit 73 and conduits 74 and 75, conduits 74 and 75 communicating with elements 76 and 77 which are similar to element 27. Means for disengaging fluids intermediate of the vertical extent of chamber 70, such as at a level or zone between 10 and 90 percent of the distance between elements 76 and 77, and the bottom of conduits 26, are provided by a series of superimposed inverted channels 78 and 79 (the latter being partial channels affixed to wall 81) which extend horizontally across chamber 70 and which are arranged so that there is a space below each channel free of catalyst, which space may be employed for disengaging vapors from the catalyst. Channels 78 and 79 communicate by orifices 82 with a manifold 83, the flow of fluids therein being controlled by valve 84. Inverted channels 78 split the downwardly moving catalyst into a plurality of vertical streams which enter zones B, C, and D.

Imperforate walls or plates 85 extend from the lowermost of the series of inverted channels 78 to plate 71 and divide the downwardly moving bed of catalyst into a plurality of vertical non-communicating sections B, C, and D. Walls 85 are sealed to the wall of the vessel 81, as by welding, and form therewith a plurality of imperforate conduits which extend to the boundary of the chamber and which serve to convey and maintain the catalyst in a plurality of downwardly moving compact columns or vertical sections and also serve to prevent vapor communication between sections of the bed B, C, and D.

In operation, hydrocarbons in vapor form may be introduced by conduits 75 and elements 77, the latter communicating with inverted channels 86 which distribute the hydrocarbon vapors evenly to the catalyst, the vapors being introduced at a velocity less than sufficient to cause turbulence in the catalyst bed. The hydrocarbons may then pass upwardly, valve 84 being closed, and the unconverted portion and the conversion products of the hydrocarbons removed through conduit 73. Alternatively the flow of hydrocarbons may be reversed. However, in connection with the embodiment of the present invention shown in Fig. 8, I prefer to open valve 84, and introduce hydrocarbons through both conduits 73 and 75 and disengage commingled unconverted portions and conversion products of the hydrocarbons so introduced using inverted channels 78 and 79, the conversion zone thus consisting of zones A, B, and D. Entrance of hydrocarbon vapors into zone C is prevented by introducing an unreactive gas, such as that described above, to zone C at a point beyond the conversion zone by conduit 74 and element 76 at a pressure at least as great as, and preferably just sufficient to balance, the pressure in the conversion zone where inverted channels 78 are located. The effect of thus introducing the unreactive gas is to withdraw the catalyst in zone C from the effective conversion zone. The hydrocarbons introduced by conduits 73 and 75 may, as described below, be of the same or different composition. It will be understood that purging sections, such as were described in connection with Fig. 1, may be associated with zones B, C, and D when necessary.

The advantages and flexibility of reactors constructed and operated in accordance with the present invention may be realized by considering typical processes effected therein.

For example, the reactors described in connection with Figs. 6 and 8 may be employed for operations in which the hydrocarbon conversion catalyst is a cracking catalyst such as a siliceous catalyst of natural or synthetic origin as, for example a bentonitic clay or a silica-alumina hydrogel. These and similar catalysts are well known to the art and details of their preparation and the conditions under which they effect desired reactions of cracking, polymerization, reforming, desulfurization and the like need not be repeated here. When such a cracking catalyst is used, hydrocarbons higher boiling than gasoline may be introduced at the top of the bed of catalyst, passed downwardly through the upper part of the bed above the zone or point of catalyst withdrawal under cracking conditions to form substantial amounts, such as 25 to 50 percent, of gasoline and the unconverted portion and conversion products disengaged from the catalyst substantially at the point of catalyst withdrawal as described. Hydrocarbons different in composition from the first named hydrocarbons may be introduced to substantially the bottom of the bed, passed upwardly through the lower part of the bed below the zone or point of catalyst withdrawal and disengaged from the catalyst together with the unconverted portion and the conversion products of the first named hydrocarbons.

In general, the conditions in the lower part of the bed are less severe than those in the upper part because of the lower rate of catalyst circulation, the lower temperature of the catalyst (due to the endothermic reaction effected in the upper part) and the coke deposit on the catalyst. I may therefore introduce hydrocarbons, boiling in the gasoline range, either virgin or cracked materials, to the lower part and contact them with the catalyst under conditions less severe than employed in the upper part so as to improve their octane numbers and/or lead susceptibilities. Thus I may treat a virgin fraction boiling below 750° which may contain gasoline under desulfurizing conditions or I may treat a cracked gasoline fraction so as to reduce the olefinic content and/or sulfur content thereof.

In the case of the reactor described in connection with Fig. 8, I may introduce hydrocarbons of both of these types to separate vertical sections such as sections B and D or I may introduce one of such fractions to sections B and D and a fraction different in composition to section C (in this case, omitting the use of an unreactive gas).

Alternatively I may introduce fractions of the same boiling range but of different susceptibility or refractivity to cracking to the upper and lower parts of the bed; for example, I may crack a recycle gas oil in the upper part of the bed and a virgin gas oil in the lower part.

Furthermore, it is to be understood that, although the invention has been described in connection with hydrocarbon conversion reactions which include reactions such as cracking, polymerization, hydrogenation, dehydrogenation, desulfurization, reforming and the like, the invention may be applied to other processes in which fluids are contacted with fluent granular solids.

Obviously many modifications and variations of the invention as hereinbefore set forth may be made without departing from the spirit and scope thereof and therefore only such limitations should be imposed as are indicated in the appended claims.

I claim as my invention:

1. In processes wherein fluent solid hydrocarbon conversion catalyst circulates in a system comprising a conversion zone and a regeneration zone, in which conversion zone hydrocarbons contact said catalyst so as to form conversion products and concomitantly to deposit coke on said catalyst, in which regeneration zone an oxygen containing gas contacts catalyst from the conversion zone under combustion conditions so as to remove coke deposited thereon, the improvement which comprises passing fluent solid hydrocarbon conversion catalyst through said conversion zone as a continuous downwardly moving non-turbulent bed of approximately equal horizontal cross sectional area throughout its vertical extent, withdrawing from the conversion zone as at least one compact column a portion of said catalyst at a point intermediate of the vertical extent of said bed, passing hydrocarbons through substantially the complete vertical extent of said bed, disengaging hydrocarbon vapors from the portion of catalyst so withdrawn substantially at the point of withdrawal, introducing to the compact column of catalyst so withdrawn at a point beyond the conversion zone an unreactive gas at a pressure greater than the pressure in the conversion zone at the point of withdrawal of catalyst to prevent the escape of hydrocarbon vapors from the conversion zone, whereby the mass velocity of the catalyst is greater in the part of the conversion zone above the point of withdrawal of catalyst than in the part of the conversion zone below the point of withdrawal of catalyst.

2. The improvement of claim 1 characterized in that said hydrocarbons enter one end of said bed, flow substantially unimpededly through said horizontal cross sectional area of the bed throughout the vertical extent of said bed and leave said bed at the opposite end thereof.

3. The improvement of claim 1 characterized in that a hydrocarbon fraction flows downwardly through an upper portion of the bed, a second hydrocarbon fraction flows upwardly through a lower portion of the bed and both fractions after passage through their respective portions of the bed leave the bed at a common level intermediate of the vertical extent of said bed.

4. In processes wherein fluent solid contact material circulates in a system comprising a hydrocarbon conversion zone in which hydrocarbons contact said contact material and form conversion products, the improvement which comprises passing fluent solid contact material through said conversion zone as a single continuous downwardly moving non-turbulent bed of approximately equal horizontal cross sectional area throughout its vertical extent, withdrawing a portion of said contact material from the conversion zone at a level intermediate of the vertical extent thereof and at a plurality of points distributed over the horizontal cross sectional area so as to withdraw contact material evenly from various sectors of the bed, passing hydrocarbons through substantially the complete vertical extent of said bed, disengaging hydrocarbon vapors from the portion of contact material so withdrawn substantially at the points of withdrawal of contact material from the conversion zone and confining said disengaged vapors to said conversion zone, whereby the ratio of contact material flow to hydrocarbon flow is greater above said points of withdrawal than below said level.

5. In processes wherein fluent solid contact material circulates in a system comprising a conversion zone in which hydrocarbons contact said contact material and form conversion products, the improvement which comprises passing fluent solid contact material through a confined conversion zone as a continuous downwardly moving non-turbulent bed, flowing a portion of said contact material from a location intermediate the vertical extent of said bed along at least one downwardly converging path laterally pervious to flow of gases and impervious to flow of solids, said path being within said confined zone, flowing contact material downwardly from the bottom of said converging path along at least one confined path impervious to lateral flow of gases to a location outside of said bed and said confined zone, and flowing the remainder of said contact material downwardly to the bottom of said confined zone as a continuous downwardly moving non-turbulent bed.

6. In processes wherein fluent solid hydrocarbon conversion catalyst circulates in a system comprising a conversion zone in which hydrocarbons contact said catalyst and form conversion products, the improvement which comprises passing fluent solid hydrocarbon conversion catalyst through a confined conversion zone as a continuous downwardly moving non-turbulent bed of approximately equal horizontal cross sectional area throughout its vertical extent, flowing portions of said catalyst from locations intermediate the vertical extent of said bed along a plurality of downwardly converging paths laterally pervious to flow of gases and impervious to flow of solids, said paths being within said confined zone, flowing catalyst from the bottoms of each of said converging paths along confined paths impervious to lateral flow of gases to locations outside of said bed and said confined zone, and flowing the remainder of said catalyst downwardly to the bottom of said confined zone as a continuous downwardly moving non-turbulent bed having approximately the same horizontal cross sectional area as that of the bed above said converging paths.

7. In apparatus for the contact of granular fluent solids with fluids, a closed vertical housing containing a chamber of substantially equal horizontal cross sectional area throughout its vertical extent, said chamber being adapted to maintain a downwardly moving non-turbulent bed of said solid therein, inlet means for the introduction of said solids at the top of said housing, outlet means for the removal of said solids at the bottom of said housing, fluid inlet and outlet means disposed substantially at the ends of said chamber for the introduction and disengagement of fluids from a moving non-turbulent bed of said granular solid, and means for the withdrawal of solids intermediate of the vertical extent of said chamber without substantial interference in the flow of fluids from a point below said means to a point above said means in the presence of a moving non-turbulent bed of said solid, said means comprising at least one downwardly directed imperforate conduit extending beyond said housing and terminated at the upper end with a vertically extending series of inverted coaxial frusto-conical baffles, said series of baffles being of decreasing diameter in a downward direction, the lowermost baffle communicating with said conduit, said baffles being spaced apart from each other, the uppermost baffle of said series being the inner periphery of a horizontally annular channel having an inverted V-shaped cross section whereby fluent solid flowing downwardly outside said series of baffles is spaced away from said baffles.

8. The apparatus of claim 7 in which an imperforate conduit extending beyond said housing communicates with the space under said horizontally annular channel employed as said uppermost baffle.

9. A device for withdrawing from a chamber only a portion of fluent granular solids passing downwardly through said chamber in compact non-turbulent flow which comprises a vertically extending series of inverted coaxial frusto-conical baffles, said series of baffles being of decreasing diameter in a downward direction and spaced apart from each other, the uppermost baffle of said series forming the inner periphery of a horizontally annular channel having an inverted V-shape in cross section, said channel having an outside diameter substantially smaller than the horizontal extent of said chamber, and an imperforate conduit communicating with the lowermost of said baffles and extending beyond said chamber, said imperforate conduit being adapted for the flow of said solids therethrough.

10. The device of claim 9 further characterized in that said horizontally annular channel cooperates with said series of baffles to form a vapor space free of fluent solid and that a vapor conduit extending beyond said chamber communicates with said vapor space, thus providing means for the removal of vapors from said chamber.

CLYDE L. CALDWELL.

REFERENCES CITED

The following references are of record in the file of this patent:

UNITED STATES PATENTS

| Number | Name | Date |
| --- | --- | --- |
| 2,385,189 | Bowles | Sept. 18, 1945 |
| 2,416,214 | Payne | Feb. 18, 1947 |
| 2,419,519 | Evans | Apr. 22, 1947 |
| 2,432,520 | Ferro, Jr. | Dec. 16, 1947 |
| 2,432,873 | Ferro, Jr., et al. | Dec. 16, 1947 |
| 2,466,005 | Crowley, Jr. | Apr. 5, 1949 |
| 2,503,188 | Bergstrom | Apr. 4, 1950 |